Feb. 12, 1963
G. R. HUISMAN ET AL
3,077,000
METHOD AND APPARATUS FOR MANUFACTURE OF TRANSVERSE
CONTOURED REINFORCED PLASTIC
SHEET MATERIAL
Filed July 6, 1959
2 Sheets-Sheet 1
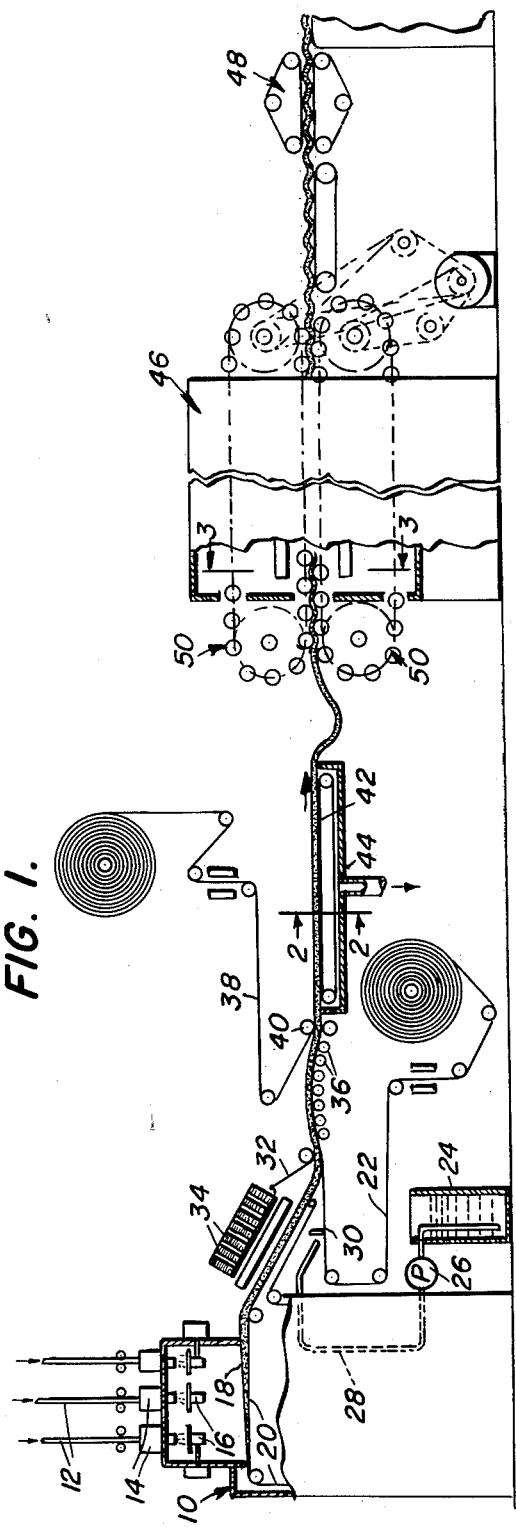
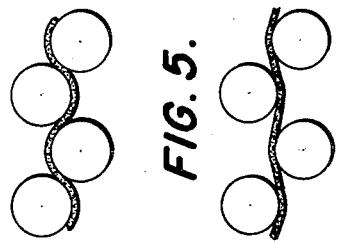
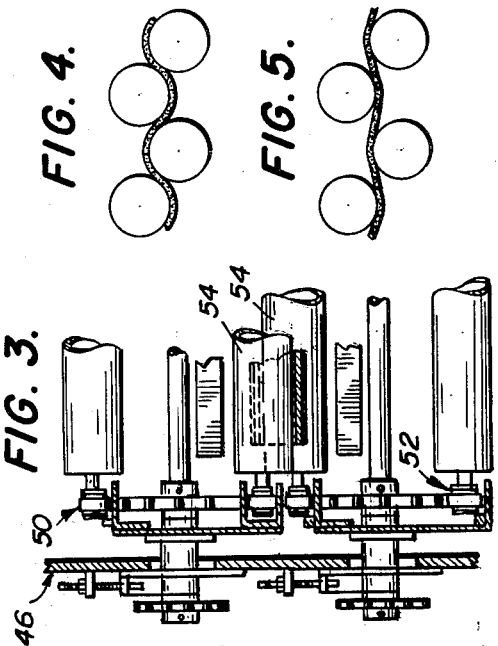
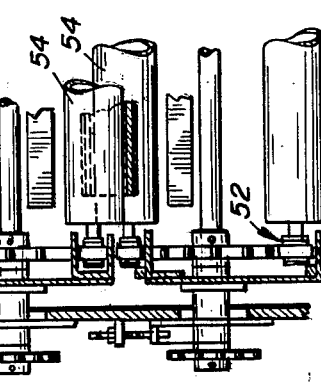
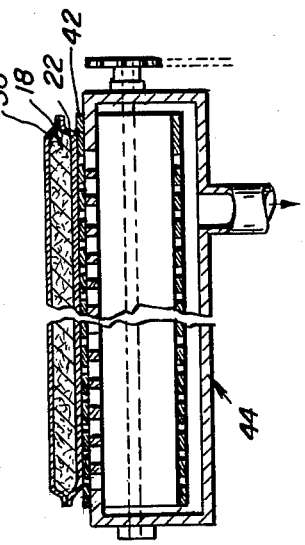
INVENTORS
GEORGE R. HUISMAN
CALHOUN SHORTS
BY
ATTORNEY Feb. 12, 1963 G. R. HUISMAN ET AL 3,077,000
METHOD AND APPARATUS FOR MANUFACTURE OF TRANSVERSE
CONTOURED REINFORCED PLASTIC
SHEET MATERIAL
Filed July 6, 1959 2 Sheets-Sheet 2
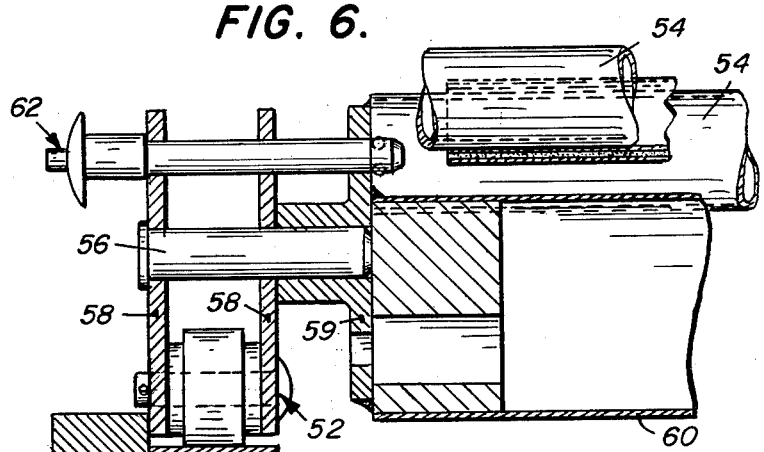
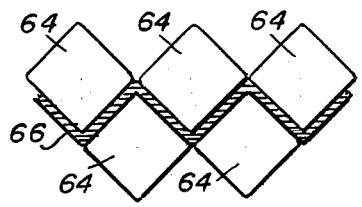
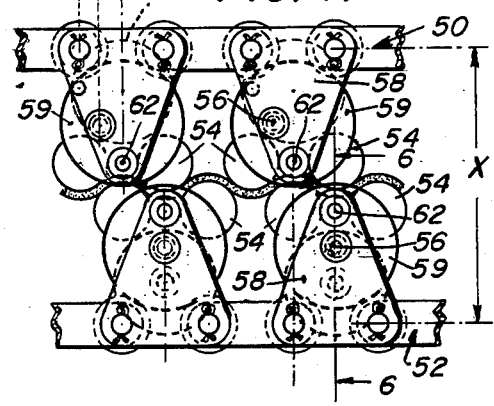
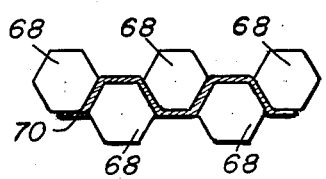
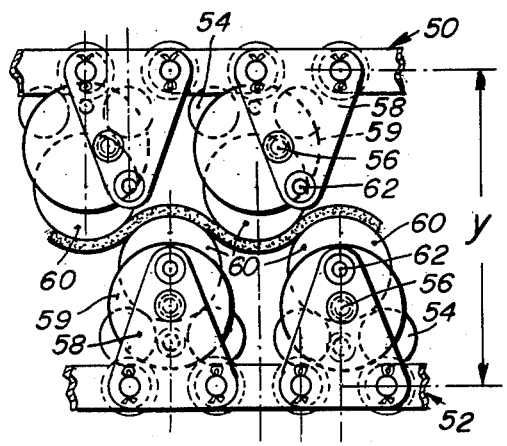
INVENTORS
GEORGE R. HUISMAN
CALHOUN SHORTS
BY
ATTORNEY United States Patent Office 3,077,000
Patented Feb. 12, 1963

3,077,000
METHOD AND APPARATUS FOR MANUFACTURE OF TRANSVERSE CONTOURED REINFORCED PLASTIC SHEET MATERIAL
George R. Huisman, Los Angeles, Calif., and Calhoun Shorts, near Bellevue, Wash., assignors to Filon Plastics Corporation, El Segundo, Calif., a corporation of California
Filed July 6, 1959, Ser. No. 825,311
4 Claims. (Cl. 18—19)

This invention relates to a method and apparatus for manufacture of transverse contoured reinforced plastic sheet material, and comprises an improvement over the "Method and Apparatus for Making Fiber Reinforced Sheet Material," patented by Calhoun Shorts on March 12, 1957, No. 2,784,763.

The invention also relates to an improvement over a joint application for patent by these same inventors entitled "Composite Sheet Fabricating Apparatus and Method," Serial No. 581,432, filed April 30, 1956, now Patent No. 2,927,623.

The present invention also includes as an essential portion of the apparatus, a construction devised by Richard E. Turner, entitled "Distributor for Strands of Material," filed June 1, 1955, Serial No. 512,458.

It has been found that the longitudinally contoured sheet material produced by the method and apparatus of the aforesaid Shorts Patent No. 2,784,763 cannot be used in certain instances because of the limitations in width of the fabricating mechanism; and it is therefore desirable that sheet material provided with transverse contours instead of longitudinal contours be produced.

It is therefore an important object of this invention to convert present-day equipment so as to provide transverse contoured panels and at the same time render the same available for variation of the pitch from crown to crown of the configuration.

Another important object of this invention is to provide apparatus which can be quickly and easily converted from the production of transverse contoured reinforced plastic sheet material of one pre-determined pitch and depth of contour to the production of material having transverse contours of a different pitch or depth.

Other and further important objects of the invention will be apparent from the disclosures in the accompanying drawings and following specification.

The invention, in a preferred form, is illustrated in the drawings and hereinafter more fully described.

In the drawings:

FIGURE 1 is an elevation, practically all diagrammatic, illustrating the mechanism for producing the transverse contoured reinforced plastic sheet material of this invention.

FIGURE 2 is an enlarged section, taken on the plane of the line 2—2 of FIGURE 1, looking in the direction indicated by the arrows.

FIGURE 3 is an enlarged detail, partly in section, on the line 3—3 of FIGURE 1.

FIGURE 4 illustrates an arrangement of the contouring elements, whereby a relatively short pitch is accomplished for relatively deep corrugations.

FIGURE 5 is a view similar to FIGURE 4, showing another arrangement of the contouring elements, whereby shallower depressions or contours are formed.

FIGURE 6 is an enlarged view of a portion of the contouring element assembly, illustrating another position of the same, and is taken on the line 6—6 of FIGURE 7.

FIGURE 7 is a detail view of the arrangement of the contouring elements, whereby a small pitch contour is accomplished, such as that illustrated in FIGURE 4.

FIGURE 8 is a view similar to FIGURE 7, but showing a different arrangement of the contouring elements, whereby a greater pitch distance results.

FIGURE 9 is a sectional view somewhat similar to the showing of FIGURES 4 and 5, but illustrating a different type of contour of the reinforced plastic sheet material.

FIGURE 10 is a section illustrating a still further type of contoured material which can be produced in the apparatus and by the method of this invention.

As shown in the drawings:

The reference numeral 10 indicates generally a hopper into which rovings of stranded glass fibers 12 are fed; and just prior to entering the hopper, these rovings are cut into relatively short lengths by units 14, and dropped upon rotating distributors 16, whereupon the severed fibers, when falling to the bottom of the hopper, automatically provide a matted layer 18. The hopper 10 is preferably maintained under a slight vacuum, whereby the dropping and the matting action is facilitated.

This mat is then deposited upon a belt or conveyor 20, which carries it out through a slot in one edge of the hopper, the slot being of a width to determine the final thickness of the mat.

As shown and described in the Shorts Patent No. 2,784,763, the mat is preliminarily deposited upon a lower carrier film 22 of some suitable material, which film has previously been covered with a layer of heat-settable resin from a container 24 and by means of a pump 26 and conduit or pipe 28. A doctor blade 30 determines the thickness of the layer of liquid resin on such lower carrier film.

The matted or stranded reinforcing material 18 is then fed onto the moving strip of film 22, and at the same time, a plurality of strands of glass or other thread 32 are brought onto the mat in parallel relationship from a number of spools 34, thereby providing a further reinforcement for the completed material.

This combination of matted fibers with reinforcing longitudinal threads and the heat-settable resin on the film 22 is then carried over an arcuate series of rollers 36, and thence under an upper carrier film 38 and between dimensioning rolls 40, which determine the final thickness of the resultant product. At this stage, the upper and lower carrier films are sealed to each other along their outer edges, thereby forming an envelope which encases the composite mat and resin.

After passing through the rolls 40, the composite mat with its protective carrier films is led onto a perforated belt conveyor 42 which moves over a vacuum chamber 44 having an air pressure of less than one atmosphere, and at a regulated pre-determined speed, whereby the envelope will be drawn into intimate contact with the conveyor belt, which will then provide a uniform gentle pulling action, thereby moving the enevelope with its enclosed fiber and resin composition through contouring elements 54. As best shown in FIG. 2 of the drawings, the perforations in the belt conveyor 42 are sufficiently small to prevent the plastic sheet material from being drawn downwardly into said perforations, said perforations serving solely as a means for exposing the lower moving strip of film 22 of the plastic sheet material to the negative pressure of the vacuum chamber 44.

This novel construction eliminates the possibility of the undesirable retention of small quantities of included air in the envelope which could ultimately accummulate and produce major defects in the product. Furthermore, the universal gentle pull of the envelope with its enclosure through the dimensioning rolls 40 eliminates the creation of undesirable unequal forces on the carrier films, which have a tendency to cause breakage of the same and also to introduce undesirable wrinkles therein, which would eventually appear in the finished product.

The formed package is then delivered under no tension whatever into a curing section 46, which comprises a heating oven common in this art. The contouring elements may extend completely or partially through the oven.

Upon leaving the oven, the contoured reinforced plastic sheet material passes through a tread-mill 48 or similar mechanism, which provides a coordinated movement of the reinforced plastic sheet material out of the oven and delivers it to and through a sawing and trimming section (not shown). At this point the reinforced plastic sheet material may be cut into pre-determined lengths or it can be rolled up into units.

The contouring elements and their action are more clearly shown in FIGURES 3 to 8, inclusive, and comprise essentially two pairs of chains 50 and 52, one pair at each edge of the material being contoured, the chains 50 being above and the chains 52 being below the normal line of travel of the work.

The upper chain of one pair is connected to the upper chain of the other pair by a sub-assembly unit which includes the transverse, cylindrical contouring elements 54. Also, the lower chain of the first mentioned pair is similarly connected to the lower chain of the other pair. Thus, the upper chains of each pair, being connected by the transverse contouring elements 54, constitute upper chain link mechanisms while the lower chains of each pair, being similarly connected, constitute lower chain link mechanisms.

While the contouring element structure in itself is rigid, the sub-assembly is pivotable about a pin 56 mounted in end plates 58 (FIGURE 6), which plates comprise portions of the links of the chains 50 and 52 themselves.

Each sub-assembly unit actually comprises a pair of hubbed end plates 59, two small contouring elements 54 and one large contouring element 60, all as best shown in FIGURES 6, 7 and 8. These three elements are welded or otherwise affixed to the end plates 59, their spacing on the hubbed end plates being such that their centers form an isosceles triangle as viewed from the end. The hub of the end plates is so positioned that, in one case its vertical center line will pass through the center line of the larger contouring element 60, and midway between the center lines of the two smaller contouring elements 54, thus the two smaller elements of one chain will be facing the two smaller elements in the other chain, as shown in FIGURE 7; in which case the elements are in position to make smaller pitch contours. The elements are obviously spaced equi-distant longitudinally.

In the case of the upper chain 50, the pivotal point 56 of the contouring sub-assembly unit is offset with respect to the previously described vertical center line. The amount of this longitudinal offset is equal to one-fourth of the pitch of the smaller contouring elements, whereby, when the entire contouring sub-assembly unit is rotated through 180°, the center line of the larger elements is shifted from a point midway between the two smaller elements to a point directly in line with one of the two smaller elements, as best shown by comparison of FIGURE 8 with FIGURE 7. In this case, the center line of the larger element 60 shifts to the left, making the new location of the larger element of the top chain midway between the centers of the larger elements of the lower chain. The respective large elements are now in position to make double pitch contours.

Indexing of the contouring sub-assembly units is obtained by the pull-out pin 62 of FIGURE 6. It is to be noted that the complete upper chain link mechanism can be vertically adjusted with respect to the lower chain link mechanism, making it possible to produce several distinct contours of various depths. With the inclusion of the pivotable contouring units, many variations of depth and pitch of reinforced plastic sheet material are obtainable, providing various alternative arrangements.

The distance line indicated by the reference letter $x$ in FIGURE 7 illustrates the relative close relationship of the upper and lower chains to produce a small pitch, and the line marked by the reference letter $y$ in FIGURE 8 indicates the increased distance relationship of the chains and their components to produce a larger pitch or contour.

Referring now to FIGURE 9, it will be noted that the cylindrical contouring elements 54 of FIGURES 6, 7 and 8 may be replaced by square contouring elements 64 and arranged in such relationship on the upper and lower chains that angular contours may be formed in the sheet material, as illustrated at 66 in this figure.

In FIGURE 10, the reference numeral 68 discloses contouring elements which, when properly positioned in the mechanism, will produce a contoured sheet 70, which is semi-hexagonal in each individual cross section.

If the desired transverse contours are simple designs, the preferred forming elements may be metal tubes, the tubes associated with the upper chains being in staggered relationship with the tubes associated with the lower chains. If a more complicated transverse contour is desired, the forming elements, shaped to the desired contour, could be attached to the upper and lower chains in mating relationship, as illustrated in FIGURES 7 and 8.

We are aware that many changes may be made and numerous details of construction varied throughout a wide range without departing from the principles of this invention, and we, therefore, do not propose limiting the patent granted hereon otherwise than as necessitated by the prior art.

We claim as our invention:

1. In an apparatus for producing transversely contoured reinforced plastic sheet material, the combination of: conveyor means for said sheet material, said conveyor means including a perforated belt conveyor adapted to receive said sheet material and a vacuum chamber disposed in supporting relationship with said perforated belt conveyor, the perforations of said belt being sufficiently small to prevent said sheet material from being drawn thereinto as said sheet material is carried thereby; and contouring means disposed adjacent said belt conveyor, said contouring means including upper and lower chain link mechanisms having a plurality of contouring elements extending therebetween and movable into engagement with said plastic sheet material to contour the same, each of said upper and lower chain link mechanisms incorporating a plurality of larger contouring elements and a plurality of smaller contouring elements whereby said smaller or larger contouring elements may be selectively engaged with said plastic sheet material to form different sizes of contours therein, said upper and lower chain link mechanisms having pivotally mounted plates thereupon for supporting said smaller contouring elements at one extremity thereof and said larger contouring elements at the other extremity thereof to permit said smaller and larger contouring elements to be selectively rotated into engagement with said plastic sheet.

2. In an apparatus adapted to form transversely oriented contours in continually moving plastic sheet material, the combination of: a perforated conveyor belt adapted to receive said sheet material, the perforations of said belt being sufficiently small to prevent said sheet material from being drawn thereinto; a vacuum chamber disposed in overlying relationship with said perforated conveyor belt adapted to hold said sheet material in close contiguity with said belt; and contour forming means mounted adjacent said conveyor belt, said contour forming means including upper and lower chain link mechanisms having hubbed end plates mounted thereupon and said end plates having larger and smaller contouring elements extending therebetween to permit the selective engagement of said elements with said plastic sheet material to form correspondingly larger or smaller transverse contours in said plastic sheet material, said upper and lower chain link mechanisms having pivotally mounted plates thereupon for supporting said smaller contouring elements at one extremity thereof and said larger contouring elements at the other extremity thereof to permit said smaller and larger contouring elements to be selectively rotated into engagement with said plastic sheet and pin means for maintaining said plates in selected positions to permit said selective engagement.

3. In an apparatus adapted to form transversely oriented contours in continually moving plastic sheet material, the combination of: a perforated conveyor belt adapted to receive said sheet material, the perforations of said belt being sufficiently small to prevent said sheet material from being drawn thereinto; a vacuum chamber disposed in overlying relationship with said perforated conveyor belt adapted to hold said sheet material in close contiguity with said belt; and contour forming means mounted adjacent said conveyor belt, said contour forming means including upper and lower chain link mechanisms having hubbed end plates mounted thereupon and said end plates having larger and smaller contouring elements extending therebetween to permit the selective engagement of said elements with said plastic sheet material to form correspondingly larger and smaller transverse contours in said plastic sheet material, said hubbed end plates being piovtally mounted for rotation on said chain link mechanisms to permit the rotation thereof to move said larger or smaller contouring elements into contiguity with said plastic sheet material.

4. In an apparatus adapted to form transversely oriented contours in continually moving plastic sheet material, the combination of: a perforated conveyor belt adapted to receive said sheet material, the perforations of said belt being sufficiently small to prevent said sheet material from being drawn thereinto; a vacuum chamber disposed in overlying relationship with said perforated conveyor belt adapted to hold said sheet material in close contiguity with said belt; contour forming means mounted adjacent said conveyor belt, said contour forming means including upper and lower chain link mechanisms having hubbed end plates mounted thereupon and said end plates having larger and smaller contouring elements extending therebetween to permit the selective engagement of said elements with said plastic sheet material to form correspondingly larger and smaller transverse contours in said plastic sheet material, said hubbed end plates being pivotally mounted for rotation on said chain link mechanisms to permit the rotation thereof to move said larger or smaller contouring elements into contiguity with said plastic sheet material; and pin means interposed between said chain link mechanisms and said hubbed end plates to maintain said hubbed end plates and said contouring elements mounted thereupon in predetermined positions.

References Cited in the file of this patent
UNITED STATES PATENTS

| | | |
|---|---|---|
| 1,852,451 | Everett | Apr. 5, 1932 |
| 2,362,168 | Stokes | Nov. 7, 1944 |
| 2,526,945 | Gray | Oct. 24, 1950 |
| 2,639,759 | Simison | May 26, 1953 |
| 2,660,757 | Smith et al. | Dec. 1, 1953 |
| 2,731,066 | Hogendobler et al. | Jan. 17, 1956 |
| 2,764,193 | Knowles | Sept. 25, 1956 |
| 2,783,175 | Smith et al. | Feb. 26, 1957 |
| 2,784,763 | Shorts | Mar. 12, 1957 |
| 2,938,567 | Allan | May 31, 1960 |
| 2,939,509 | Hoffman | June 7, 1960 |